UNITED STATES PATENT OFFICE.

ELBRIDGE S. PIXLEY, OF GREAT BARRINGTON, MASSACHUSETTS.

IMPROVED COMPOSITION FOR FILLING THE PORES OF WOOD, &c.

Specification forming part of Letters Patent No. 50,384, dated October 10, 1865.

*To all whom it may concern:*

Be it known that I, ELBRIDGE S. PIXLEY, of Great Barrington, in the county of Berkshire and State of Massachusetts, have invented a new and useful composition for sizing or filling up the grain of wood preparatory to varnishing or painting, of which the following is a specification:

The component parts of my composition are glue, acetic acid, boiled oil, alcohol, and vinegar, and are used in the preparation as follows: To prepare one gallon of the size, take one and one-half pound best quality glue, one-half pound acetic acid, with vinegar or alcohol enough to cover the glue; put into a stone or copper vessel, and dissolve by gentle heat. Put one gill of boiled oil and one-half pint alcohol together, and stir or shake briskly to make them mix, and stir into the first-named preparation while warm.

What I claim as my invention is—

The use of acetic acid to destroy the adhesive property of the glue, and the combination of the various ingredients named in such way as to secure the object desired.

ELBRIDGE S. PIXLEY.

Witnesses:
A. D. WHITMORE,
G. E. WHITMORE.